United States Patent
Probert et al.

(10) Patent No.: US 8,855,877 B2
(45) Date of Patent: Oct. 7, 2014

(54) CONTROLLING GEARSHIFTING TO PREVENT POWERTRAIN HUNTING

(75) Inventors: Brad Probert, Farmington Hills, MI (US); Jeremy L. Russell, Livonia, MI (US); Cory B. LaRoche, Wixom, MI (US); Philip J. Wiethe, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 423 days.

(21) Appl. No.: 13/285,138

(22) Filed: Oct. 31, 2011

(65) Prior Publication Data
US 2013/0109534 A1    May 2, 2013

(51) Int. Cl.
| | | |
|---|---|---|
| G06F 7/00 | (2006.01) |
| F16H 61/10 | (2006.01) |
| F16H 59/48 | (2006.01) |
| F16H 59/68 | (2006.01) |
| F16H 61/02 | (2006.01) |

(52) U.S. Cl.
CPC ............... *F16H 61/10* (2013.01); *F16H 59/48* (2013.01); *F16H 2059/6815* (2013.01); *F16H 2061/0216* (2013.01)

USPC .......................................... 701/58; 477/120

(58) Field of Classification Search
None
See application file for complete search history.

(56) References Cited

U.S. PATENT DOCUMENTS

| | | | |
|---|---|---|---|
| 5,166,879 | A | 11/1992 | Greene et al. |
| 5,241,476 | A | 8/1993 | Benford et al. |
| 5,388,856 | A | 2/1995 | Yonezawa |
| 5,738,605 | A | 4/1998 | Fliearman et al. |
| 6,098,004 | A | 8/2000 | Grytzelius et al. |
| 6,220,987 | B1 | 4/2001 | Robichaux et al. |
| 6,524,221 | B2 | 2/2003 | Nishimura |
| 7,409,885 | B2 | 8/2008 | Krauss et al. |
| 7,529,607 | B2 | 5/2009 | Aubert |
| 2010/0121543 | A1 | 5/2010 | Landes et al. |

*Primary Examiner* — Erin D Bishop
(74) *Attorney, Agent, or Firm* — James Dottavio; MacMillan, Sobanski & Todd, LLC

(57) ABSTRACT

A method for controlling gearshifts of an automatic transmission includes preventing an upshift while the vehicle accelerates on an ascending grade, if predicted vehicle acceleration in a target gear is less than a reference vehicle acceleration in the target gear; accelerating the vehicle on the grade; and producing the upshift, if predicted vehicle acceleration in the target gear is greater than a reference vehicle acceleration.

11 Claims, 4 Drawing Sheets

CONTROLLING GEARSHIFTING TO PREVENT POWERTRAIN HUNTING

BACKGROUND OF THE INVENTION

1. Field of the Invention

This invention relates generally to a powertrain control system algorithm that increases shift point engine speed of heavily loaded vehicles to prevent powertrain hunting, but allows upshifts.

2. Description of the Prior Art

During operation of a automatic transmission for a motor vehicle a cycle can occurs, during which the transmission upshifts automatically, vehicle speed slows, the transmission downshifts automatically, causing vehicle speed to increase. This cycle is often called powertrain hunting.

A control strategy to prevent powertrain hunting (PPH) would inhibit transmission upshifts to a higher gear, if the upshift would prevent vehicle acceleration in the upshifted gear. If the transmission upshifts with the vehicle heavily loaded or ascending a grade, vehicle speed would decrease and quickly cause a downshift.

Powertrain hunting can be avoided by preventing an upshift and holding the transmission in the lower gear. When this strategy is applied to a high speed truck powertrain, the engine can overheat due to the inability of the engine cooling fan to adequately cool the powertrain at sustained high engine speed.

Heavily loaded trucks can drive for several miles up steep grades, held at a lower gear with the engine running at high speed. This high speed operation causes powertrain overheating.

SUMMARY OF THE INVENTION

A method for controlling gearshifts of an automatic transmission includes preventing an upshift while the vehicle accelerates on an ascending grade, if predicted vehicle acceleration in a target gear is less than a reference vehicle acceleration in the target gear; accelerating the vehicle on the grade; and producing the upshift, if predicted vehicle acceleration in the target gear is greater than a reference vehicle acceleration.

The control prevents loss of vehicle speed on an ascending grade if an upshift to a target gear were to occur by alternately allowing or disallowing the upshift on the basis of predicted vehicle acceleration in the target gear.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
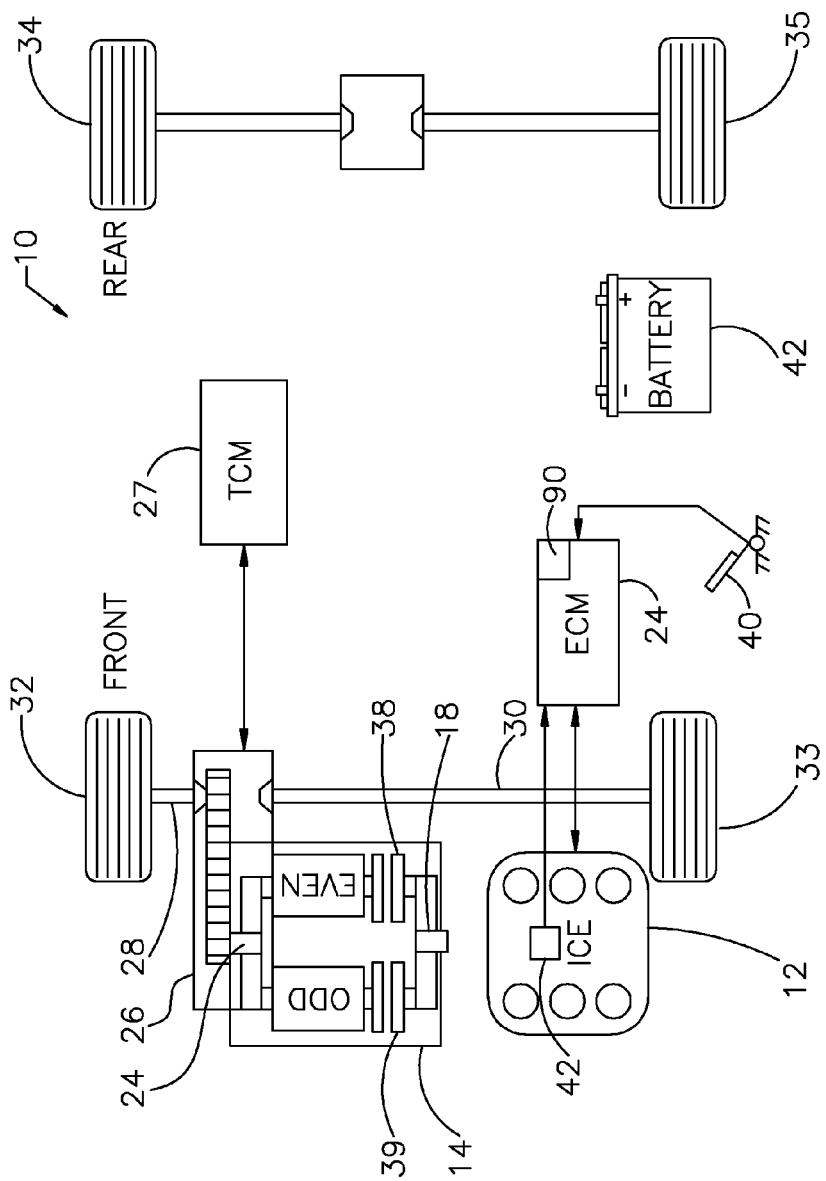
FIG. 1 is a schematic diagram showing a powertrain for a motor vehicle.

Referring first to FIG. 1, a powertrain 10 includes a power source such as an internal combustion engine 12, a diesel engine or gasoline engine; an automatic transmission 14 connected by shaft 18 to the engine for producing multiple forward speed ratios and reverse drive; and a final drive unit and differential mechanism 26 connected to the transmission output 24. Front axles 28, 30 connected to the output of mechanism 26 drive the front wheels 32, 33, respectively. The vehicle is supported also 34, 35.

Transmission 14 is able change the speed and torque of axles 28, 30 relative to the speed and torque of input shaft 18 by producing upshifts and downshifts among the gears of the transmission.

An electronic engine control module (ECM) 24 controls operation of engine 12. An electronic transmission control module (TCM) 27 controls operation of transmission 14 and its input clutches 38, 39.

Displacement of accelerator pedal 40 by the vehicle operator produces a signal indicating a desired magnitude of wheel torque transmitted from engine 12 through the powertrain 10 to the driven wheels 32, 33. ECM 24 includes an engine speed control limiter 42, which protects engine 12 against excessive speed by preventing engine speed above a predetermined limit speed. A throttle 44, controlled either by ECM 24 or directly by the operator control over accelerator pedal 40, controls the flow rate of air into the cylinders of engine 12.

Figure 2:
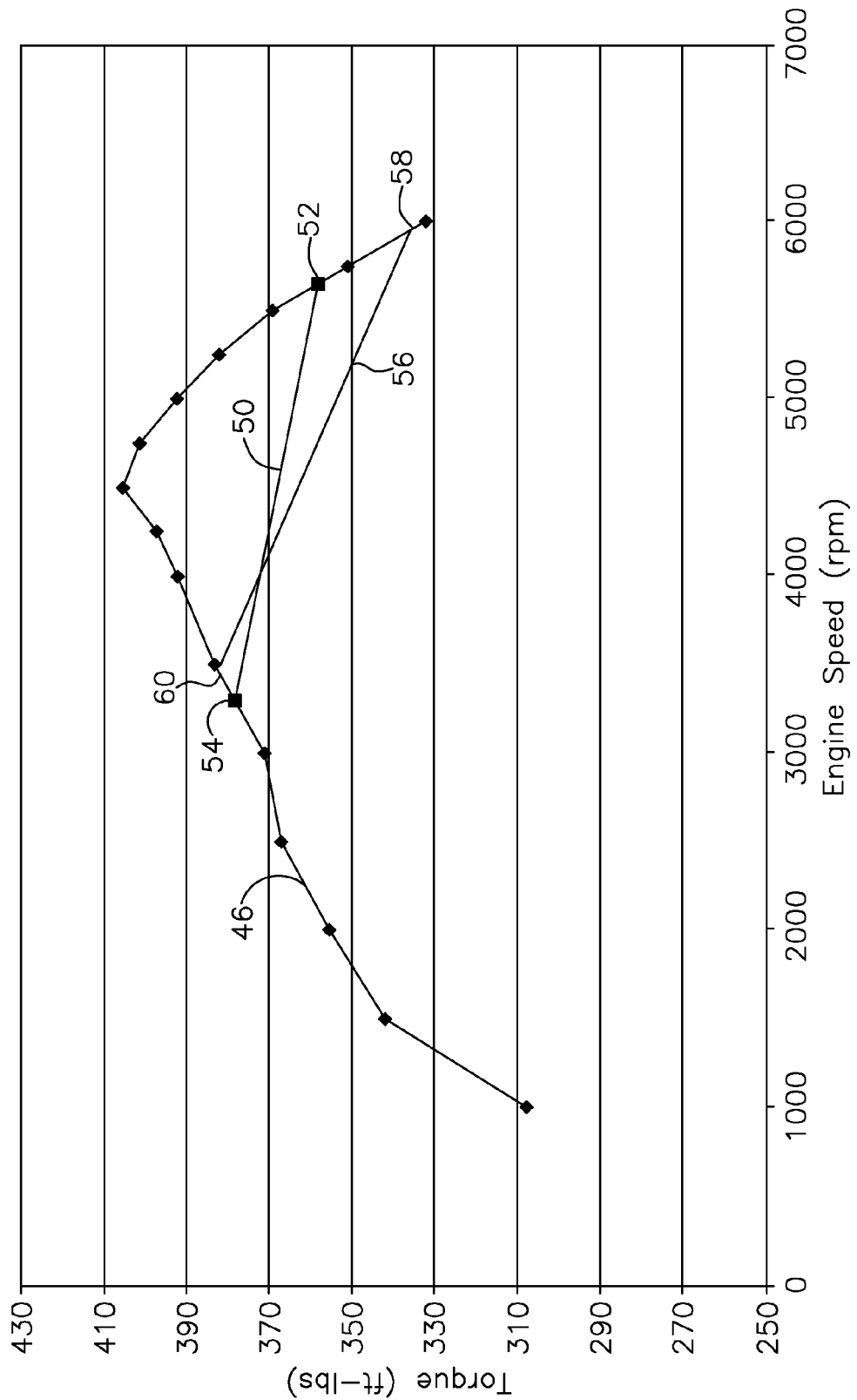
FIG. 2 is a graph showing the variation of engine torque produced as engine speed changes at wide open throttle.

A control strategy that prevents powertrain hunting defines transmission shift points for the current loaded and unloaded state of the vehicle and a range of positive slopes of the road surface. The graph of FIG. 2 shows the variation 46 of torque produced by engine 12 as engine speed changes under wide open throttle conditions. Line 50 represents the engine torque-engine speed relationship at a shift point from first gear to second gear when the vehicle is unloaded or lightly loaded. Transmission output torque in first gear 52 at 5650 rpm is about 1424 ft-lbs; transmission output torque in second gear 54 at 3296 rpm is about 877 ft-lbs. Transmission output torque is reduced by about 547 ft-lbs when this 1-2 upshift occurs.

Line 56 represents the engine torque-engine speed relationship at a shift point from first gear to second gear when the vehicle is loaded and operating on a grade with positive slope. Transmission output torque in first gear 58 at 5950 rpm is about 1335 ft-lbs; transmission output torque in second gear 60 at 3471 rpm is about 886 ft-lbs. Transmission output torque is reduced by about 449 ft-lbs when this 1-2 upshift occurs.

Figure 3:
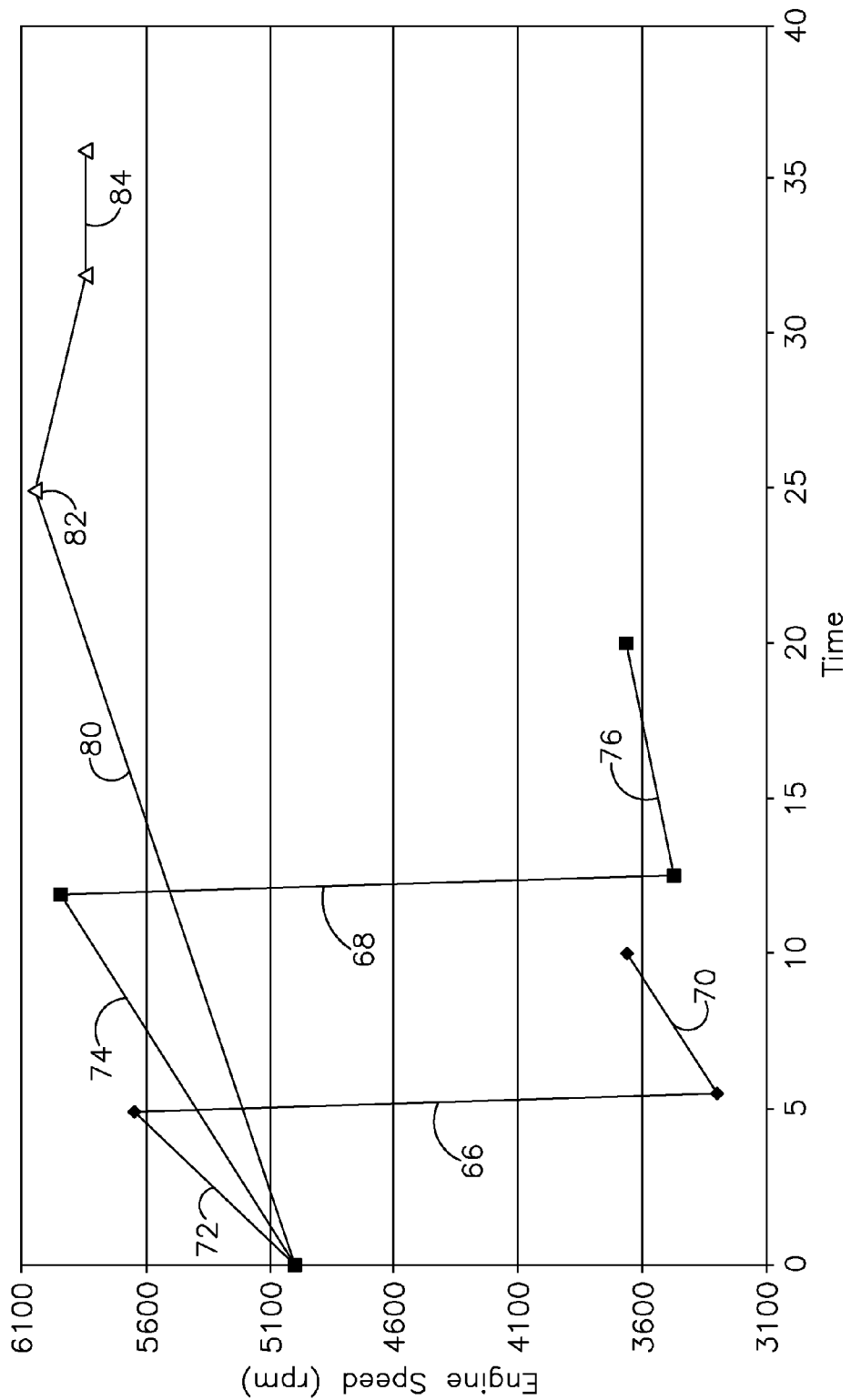
FIG. 3 is a graph showing shift points for vehicles ascending a grade while unloaded, loaded on a moderate grade, and heavily loaded on a steep grade.

With reference to FIG. 3 where transmission shift points are illustrated, a shift point 66 may occur at a low engine speed under normal operating conditions, i.e., when the vehicle is not heavily loaded or not ascending a grade. If an upshift at the first shift point 66 is prevented by the transmission controller 27 and the vehicle continues to accelerate while ascending the grade, later shift points occur at higher engine speeds, close to the engine redline speed, which brings the powertrain 10 closer to its tractive effort crossover, i.e., the condition wherein torque at the transmission output 24 in the higher target gear, to which the transmission is being upshifted, is equal to or greater than the transmission output torque in the lower gear, from which the transmission is being upshifted.

At the first shift point 66, vehicle acceleration in the current gear 72 and the vehicle acceleration in the target gear 70 are checked. If vehicle acceleration in the target gear 70 is less than a calibrated reference vehicle acceleration, an upshift would be prevented by the transmission controller 27. The calibrated reference vehicle acceleration, which is a function of the current gear in which the transmission is operating, the target gear, current vehicle acceleration, engine speed, and engine output torque, are stored in electronic memory accessible to a transmission controller 27.

The reference vehicle acceleration indicates whether the powertrain 10 would produce wheel torque in the target gear sufficient to increase vehicle speed at an acceptable acceleration while the vehicle ascends the grade. If the transmission controller 27 disallows the upshift, the vehicle continues to accelerate to a higher speed shift point, where the transmission 14 would upshift; provided vehicle acceleration 76 in the target gear would be greater than the reference vehicle acceleration corresponding to the current, higher engine speed shift point. The required vehicle acceleration at the higher engine speed shift point is less than required vehicle acceleration at the lower engine speed shift point 66 due to the smaller reduction in transmission output 24 torque in the higher target gear due to the shape of the torque curve 56.

Similarly when the vehicle is loaded and operating on a moderate grade with a positive slope, at the shift point 68, vehicle acceleration in the current gear 74 and the vehicle acceleration in the target gear 76 are checked. If vehicle acceleration in the target gear 76 is less than the corresponding reference vehicle acceleration, powertrain 10 would lack capacity to produce sufficient wheel torque in the target gear to continue to accelerate the vehicle, and the upshift would be disallowed by controller 27. The vehicle would then continue to accelerate while ascending the grade to a higher speed shift point, where the transmission 14 would upshift; provided vehicle acceleration 76 in the target gear is greater than a lower reference vehicle acceleration at the higher engine speed shift point.

Line 80 represents relatively low acceleration of a heavily loaded vehicle ascending a steep grade. However, because the transmission controller 27 determines that vehicle acceleration in the target gear is less than the reference vehicle acceleration, an upshift is disallowed and prevented by the transmission controller 27.

The engine controller ECM 24 includes an engine speed limiter 90, which protects the engine 12 against overspeeding. The engine speed limiter 90 temporarily allows a higher operating engine speed for a period of reference length. If the predicted vehicle acceleration in the target gear is less than the reference vehicle acceleration at the higher engine speed shift point, the engine speed limiter 90 prevents the engine from overspeeding 82 and reduces engine torque in order to maintain a longer term maximum engine operating speed 84.

If the predicted vehicle acceleration in the target gear is less than the reference vehicle acceleration at the higher engine speed shift point, the vehicle is held by the engine speed limiter 90. But the upshift would be allowed once a small transmission output torque margin is satisfied. The margin is determined by comparing transmission output torque available in the current gear to transmission output torque available in the target gear. This condition occurs while ascending a road with varying grades. At the steepest point of the grade, the acceleration criteria may not be met and the engine 12 may be held at a sustained speed 84 by the engine speed limiter 90. However, if the grade decreases, the engine speed limiter 90 will decrease engine torque to maintain the engine speed. If this torque decrease is significant enough, it may allow the powertrain 10 to meet transmission output torque margin since although the gear ratio in the upshifted gear is lower, when in the upshifted gear the engine will no longer be reduced in torque by the engine speed limiter 90.

Based on the two-tiered shift point and two-tiered acceleration checks done before engine speed is held constant by engine speed limiter 90, one can calibrate the torque margin to a much lower value than typical knowing that the vehicle was operating in a special heavily loaded condition. With the vehicle heavily loaded and wanting to prevent powertrain overheating, controller 27 could allow an upshift at a zero vehicle acceleration rate, thereby allowing the powertrain 10 to cool. Typically torque margins are set higher to allow some amount of reserve torque available in the higher gear to ensure continued acceleration. But in this heavily loaded condition, zero vehicle acceleration after the upshift is acceptable due to the need to cool the powertrain 10.

Sustained high engine speed would overheat the powertrain 10, forcing it to operate at lower engine speed by engine speed limiter 90, to reduce heat generation. These lower speeds would directly correlate to degraded towing performance because the vehicle is forced to operate at lower speeds.

Figure 4:
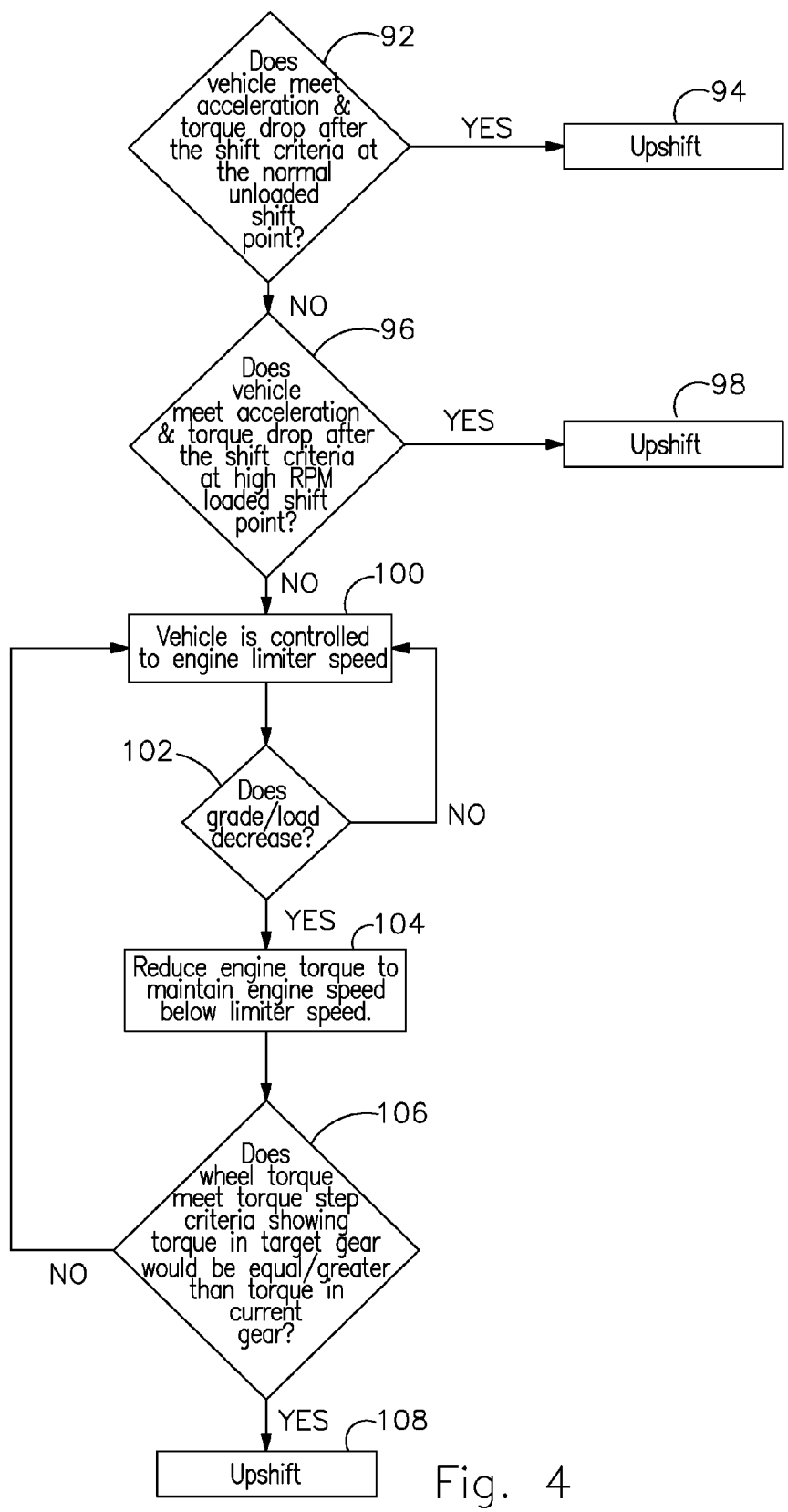
FIG. 4 is a logic flow diagram of the control method.

FIG. 4 is a logic flow diagram of the control method. At step 92 a test is performed to determine if vehicle acceleration in the target gear is less than the reference vehicle acceleration and if the transmission output torque difference between the target gear and the current gear is less than the reference torque difference. If the result of test 92 is logically true, at step 94 the upshift is performed.

At step 96 a test is performed to determine if vehicle acceleration in the target gear at a higher engine speed and vehicle load meets the criteria. If the result of test 96 is true, at step 98 the upshift is performed.

If the result of both tests 92 and 96 is false, at step 100 engine speed limiter 90 is activated.

At step 102 a test is performed to determine if the vehicle load or slope of the grade being ascended has decreased. If the result test 102 is false, control returns to step 100. If the result test 102 is true, at step 104 engine torque is reduced, such that the engine speed is maintained below the maximum speed set by the engine speed limiter 90.

At step 106 a test is performed to determine if transmission output torque in the target gear is not less than transmission output torque in the current gear. If the result of test 106 is true, the upshift is performed at step 108. If the result of test 106 is false, control returns to step 100.

In accordance with the provisions of the patent statutes, the preferred embodiment has been described. However, it should be noted that the alternate embodiments can be practiced otherwise than as specifically illustrated and described.

The invention claimed is:

1. A method for controlling gearshifts of an automatic transmission, comprising:
 (a) preventing an upshift while a vehicle accelerates on an ascending grade, if a predicted vehicle acceleration in a target gear is less than a reference vehicle acceleration in the target gear;
 (b) accelerating the vehicle on the grade;
 (c) producing the upshift, if the predicted vehicle acceleration in the target gear is greater than the reference vehicle acceleration; wherein step (c) further includes using an engine speed limiter to prevent speed of an engine that drives the vehicle from exceeding a reference speed, and using the engine speed limiter to allow the engine speed to exceed the reference speed for a period of reference length.

2. The method of claim 1, wherein steps (a) through (c) are performed with an engine that drives the vehicle at wide open throttle.

3. The method of claim 1, further comprising:
if the predicted vehicle acceleration in the target gear is less than a reference vehicle acceleration at higher engine speed shift point, then determining a difference between transmission output torque available in a current gear and transmission output torque available in the target gear, and producing the upshift if said difference is greater than a reference transmission output torque difference.

4. A method for controlling automatic transmission gearshifts, comprising:
   (a) preventing an upshift while a vehicle accelerates on an ascending grade, if a predicted vehicle acceleration in a target gear is less than a reference vehicle acceleration;
   (b) accelerating the vehicle on the grade;
   (c) producing the upshift, if the predicted vehicle acceleration in the target gear is greater than the reference vehicle acceleration;
   (d) producing the upshift, if said vehicle acceleration is less than the reference vehicle acceleration and a difference between transmission output torque in a current gear and in the target gear is greater than a reference torque difference.

5. The method of claim 4, wherein steps (a) through (d) are performed with an engine that drives the vehicle at wide open throttle.

6. The method of claim 4, wherein step (c) further includes:
   using an engine speed limiter to prevent speed of an engine that drives the vehicle from exceeding a reference speed; and
   using the engine speed limiter to allow the engine speed to exceed the reference speed for a period of reference length.

7. A method for controlling gearshifts of an automatic transmission, comprising:
   (a) preventing an upshift while a vehicle accelerates on an ascending grade, if a predicted vehicle acceleration in a target gear is less than a reference vehicle acceleration in the target gear;
   (b) producing the upshift while the vehicle accelerates on the grade, if the predicted vehicle acceleration in the target gear is greater than the reference vehicle acceleration; and
   (c) if the predicted vehicle acceleration in the target gear is less than a reference vehicle acceleration at a higher engine speed shift point, then determining a difference between transmission output torque available in a current gear and transmission output torque available in the target gear, and producing the upshift if said difference is greater than a reference transmission output torque difference.

8. The method of claim 7, wherein steps (a) and (b) are performed with an engine that drives the vehicle at wide open throttle.

9. The method of claim 7, further comprising:
   producing the upshift, if said vehicle acceleration is less than the reference vehicle acceleration and a difference between transmission output torque in a current gear and in the target gear is greater than a reference torque difference.

10. The method of claim 7, wherein steps (a) and (b) are performed while the vehicle continues to accelerate.

11. The method of claim 7, wherein step (b) further includes:
   using an engine speed limiter to prevent speed of an engine that drives the vehicle from exceeding a reference speed;
   using the engine speed limiter to allow the engine speed to exceed the reference speed for a period of reference length.

* * * * *